(12) United States Patent
Welch et al.

(10) Patent No.: US 7,068,274 B2
(45) Date of Patent: Jun. 27, 2006

(54) SYSTEM AND METHOD FOR ANIMATING REAL OBJECTS WITH PROJECTED IMAGES

(75) Inventors: Gregory F. Welch, Carrboro, NC (US); Kok-Lim Low, Carrboro, NC (US); Ramesh Raskar, Somerville, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 242 days.

(21) Appl. No.: 09/930,322

(22) Filed: Aug. 15, 2001

(65) Prior Publication Data

US 2003/0034974 A1   Feb. 20, 2003

(51) Int. Cl.
*G06T 15/50* (2006.01)

(52) U.S. Cl. .................. 345/426; 345/581; 345/589; 345/473; 348/51

(58) Field of Classification Search ........... 345/420, 345/426, 473, 418, 632, 430, 63, 582, 8, 345/419, 427, 581, 589; 348/51
See application file for complete search history.

(56) References Cited

U.S. PATENT DOCUMENTS

| | | | | |
|---|---|---|---|---|
| 4,978,216 | A | 12/1990 | Liljegren et al. | 353/28 |
| 5,936,628 | A * | 8/1999 | Kitamura et al. | 345/420 |
| 6,226,004 | B1 | 5/2001 | Nishihara | 345/420 |
| 6,281,904 | B1 * | 8/2001 | Reinhardt et al. | 345/582 |
| 6,415,050 | B1 * | 7/2002 | Stegmann et al. | 382/154 |
| 6,511,426 | B1 * | 1/2003 | Hossack et al. | 600/437 |
| 6,516,099 | B1 * | 2/2003 | Davison et al. | 382/284 |
| 6,593,924 | B1 * | 7/2003 | Lake et al. | 345/426 |
| 6,636,627 | B1 * | 10/2003 | Oosawa | 382/154 |

OTHER PUBLICATIONS

Raskar et al, Dec. 1999, "Shader Lamps: Animating Real Objects with Image-Based Illumination", pp. 1-10.*
Debevec et al., "Efficient View-Dependent Image-Based Rendering with Projective Texture-Mapping"; Proceedings of 9th Eurographics Workshop on Rendering, 1998.
Debevec et al., "Modeling and Rendering Architecture from Photographs: A Hybrid Geometry-and Image-Based Approach"; Computer Graphics Proceedings, Annual Conference Series, 1996.
Kajiya, "The Rendering Equation"; Computer Graphics Proceedings, vol. 20, No. 4, 1986.
Raskar et al., "Table-Top Spatially-Augmented Reality: Bringing Physical Models to Life with Projected Imagery".
Raskar et al., "Multi-Projector Displays Using Camera-Based Registration"; Proceedings of IEEE Visualization, 1999.

* cited by examiner

*Primary Examiner*—Kimbinh T. Nguyen
(74) *Attorney, Agent, or Firm*—Dirk Brinkman; Andrew J. Crubin (57) ABSTRACT

A computer implemented method animates a 3D physical object by first acquiring a 3D graphics model of the object. The model is edited with graphics authoring tools to reflect a desired appearance of the object. The edited model is rendered as an image considering a user location and a location of a virtual light. Then, intensity values of the image are corrected according to an orientation of a surface of the object and a radiance at the surface. The 3D physical object can finally be illuminated with the corrected image to give the 3D physical object the desired appearance under the virtual light when viewed from the user location.

16 Claims, 9 Drawing Sheets

FIG. 1

```
glMatrixMode( GL_PROJECTION );
glLoadMatrix( intrinsic matrix of projector );
glMultMatrix( xform for rendering view );
glMultMatrix( inverse(xform for shading view) );
glMatrixMode( GL_MODEL VIEW );
glLoadMatrix( xform for shading view );
// set virtual light positon(s)
// render graphics model
```

At each projector,
  Compute boundaries between regions of overlap count 1 and >1
  Compute depth discontinuities using edge detection in depth buffer
  For each pixel in overlap region
    update shortest distance to overlap count = 1 region ignoring
        paths crossing depth discontinuity At each projector,
  For each pixel in overlap region
    Find all corresponding pixels in other projectors
    Assign weights inversely proportional to the shortest distance

SYSTEM AND METHOD FOR ANIMATING REAL OBJECTS WITH PROJECTED IMAGES

FIELD OF THE INVENTION

This invention relates generally animating real objects, and more particularly to animating real objects with computer graphics images.

BACKGROUND OF THE INVENTION

Computer graphics systems can acquire or synthesize images of real or imaginary objects and scenes, and then reproduce these in a virtual world. More recently, computer systems have also attempted to do the reverse—to "insert" computer graphics images into the real world. Primarily, this is done indirectly for special effects in movies, and for real-time augmented reality. Most recently, there is a trend to use light projectors to render imagery directly in real physical environments.

Despite the many advances in computer graphics, the computer has yet to replace the actual material experience of physical shape and spatial relationships. Designers, such as architects, urban planners, automotive engineers, artists and animators still resort to sculpting physical models before the design is finalized. One reason for this is that the human interface to a physical model is totally intuitive. There are no controls to manipulate, or displays to look through or wear. Instead, the model can be viewed from many perspectives while gazing generally or focusing on interesting components, all at very high visual, spatial, and temporal fidelity.

When an object or scene is illuminated by a neutral (white) light, it is perceived according to the particular wavelengths of the light reflected by its surface. Because the attributes of the surface are dependent only on the spectrum of the perceived light, many attributes of objects can effectively be simulated by incorporating the object's attributes into the light source to achieve an equivalent effect on a neutral object. Thus, even non-realistic appearances can be visualized.

A rotating movie camera has been used to acquire a film of a living room, replete with furniture, and people. The room and furniture were then painted a neutral white, and the film was projected back onto the walls and furniture using a rotating projector that was precisely registered with the original camera, see Naimark, "*Displacements*," Exhibit at the San Francisco Museum of Modern Art, San Francisco, Calif. 1984. This crucial co-location of the acquiring camera and displaying projector is common to most systems that use pre-recorded images, or image sequences to illuminate physical objects.

A projector and fiber-optic bundle have been used to animate the head of a fictional fortune teller inside a real crystal ball, see U.S. Pat. No. 4,978,216 "Figure with back projected image using fiber optics" Liljegren, et al., Dec. 18, 1990. Slides of modified photographs augmented with fine details have been used with very bright projectors to render imagery on a very large architectural scale. A well known modern realization of this idea is Le Son et Lumière on Château de Blois in the Loire Valley of France. In addition, this medium is now being used elsewhere around the world to illuminate large scale structures such as bridges.

All these systems render compelling visualizations. However, cumbersome alignment processes can take several hours, even for a single projector. The "Luminous Room" project treats a co-located camera-projector pair as an I/O bulb to sense and project imagery onto flat surfaces in the real physical surroundings of a room or a designated workspace, see Underkoffler et al. "*Emancipated pixels: Real-world graphics in the luminous room*," SIGGRAPH '99, pp. 385–392, 1999. Their main focus is interaction with the information via luminous and tangible interfaces. They recognized co-planar 2D physical objects, tracked the 2D positions and orientations in the plane, and projected light from overhead to reproduce the appropriate sunlight shadows.

In the "Facade" project, a sparse set of photographs was used to model and render architectural monuments, see Debevec et al. "*Modeling and Rendering Architecture from Photographs*," SIGGRAPH '96, August 1996. Their main problems were related to occlusion, sampling, and blending issues that arise when re-projecting images onto geometric models. They addressed these problems with computer images and analytic models.

It would be useful to have a graphics system that can project images onto real three-dimensional objects or structures. It should also be possible to fit the images for any viewing orientation. In addition, it should be possible to change the appearance of illuminated objects at will. Finally, it should be possible to seamlessly fit images from multiple projectors onto a single complex object so that it can be viewed from any direction.

SUMMARY OF THE INVENTION

The invention provides a novel mode for visualizing three-dimensional computer graphics. The invention can synthesize not just textures, i.e., diffuse component of images, but also reproduce virtually any bi-directional reflectance distribution function (BRDF) using a radiance adjustment procedure. The invention also determines weighted pixel intensities across transitions of multiple overlapping images in the presence of depth discontinuities.

The present paradigm for 3D computer graphics uses multiple projectors to graphically animate physical objects or structures in the real world. The concept is to replace a physical object having inherent color, texture, and material properties with a neutral object illuminated by projected imagery, reproducing the original or alternative appearance directly on the object. In this approach, the desired visual properties of the object are effectively "lifted" into the projector.

Specifically, a computer implemented method animates a 3D physical object by first acquiring a 3D graphics model of the object. The model is edited with graphics authoring tools to reflect a desired appearance of the object. The edited model is rendered as an image considering a user location and a location of a virtual light. Then, intensity values of the image are corrected according to an orientation of a surface of the object and a radiance at the surface. The 3D physical object can finally be illuminated with the corrected image to give the 3D physical object the desired appearance under the virtual light when viewed from the user location.

DETAILED DESCRIPTION OF THE PREFERRED EMBODIMENT

Introduction

Our invention combines three-dimensional (3D) computer graphics and animation with 3D physical objects and visual attributes of real scenes to allow a user to view physical objects and structures enhanced with virtual images. We treat the illumination of a real world item as a perspective projection of 3D images where images are aligned using computer vision techniques. We not only provide textures for the physical object, the background in the scene, that is the diffuse component of illumination, but we also can reproduce virtually any bi-directional reflectance distribution function (BRDF) to change the appearance of objects and the rest of the scene. In other words, our invention applies view-independent and view-dependent visual effects to real world structures.

We describe a practical method for illuminating physical objects and scenes using a radiance adjustment procedure to guide the rendering process with correction of corresponding image intensities. We also provide solutions for a complete illumination of physical objects by merging images from multiple projectors on a complex surface. We solve the problem of merged and fragmented overlaps in the presence of depth discontinuities so that the resultant reconstructed illumination is seamless. This process can also be used by image-based rendering (IBR) applications where multiple, depth-enhanced images from different views need to be merged to render novel views.

Our system can be used to illuminate objects such as tabletop items, industrial parts, clay models, building interiors, statues, architectural monuments, entire buildings and bridges. We also provide animation, such as movement of virtual light sources and virtual rotation and linear motion of a static symmetrical physical objects. We also simulate motion of a static object and background by illuminating different parts of a physical scene with images of moving features. Our invention enable a "walk-through" of a hybrid room-sized virtual and real environment with tracked illumination.

Our invention addresses a number of problems associated with illuminating physical objects. First is the problem of geometric registration where one or more projected images need to be exactly matched with a 3D physical object. Prior art methods typically achieve this registration using extremely tedious and inaccurate manual methods. Below, we describe an automated registration method.

Second is the problem of changing the appearance of a physical object. For example, we provide techniques to make a matte object appear shiny, and a stationary object to rotate. Third is the problem of completely illuminating a non-trivial physical objects in the presence of shadows and discontinuities due to self-occlusion. Fourth is the problem of changing the appearance of a moving object. For example, we provide a solution for illuminating a moving object while changing the appearance of the object, and perhaps the background.

System Overview

Model Acquisition

Figure 1:
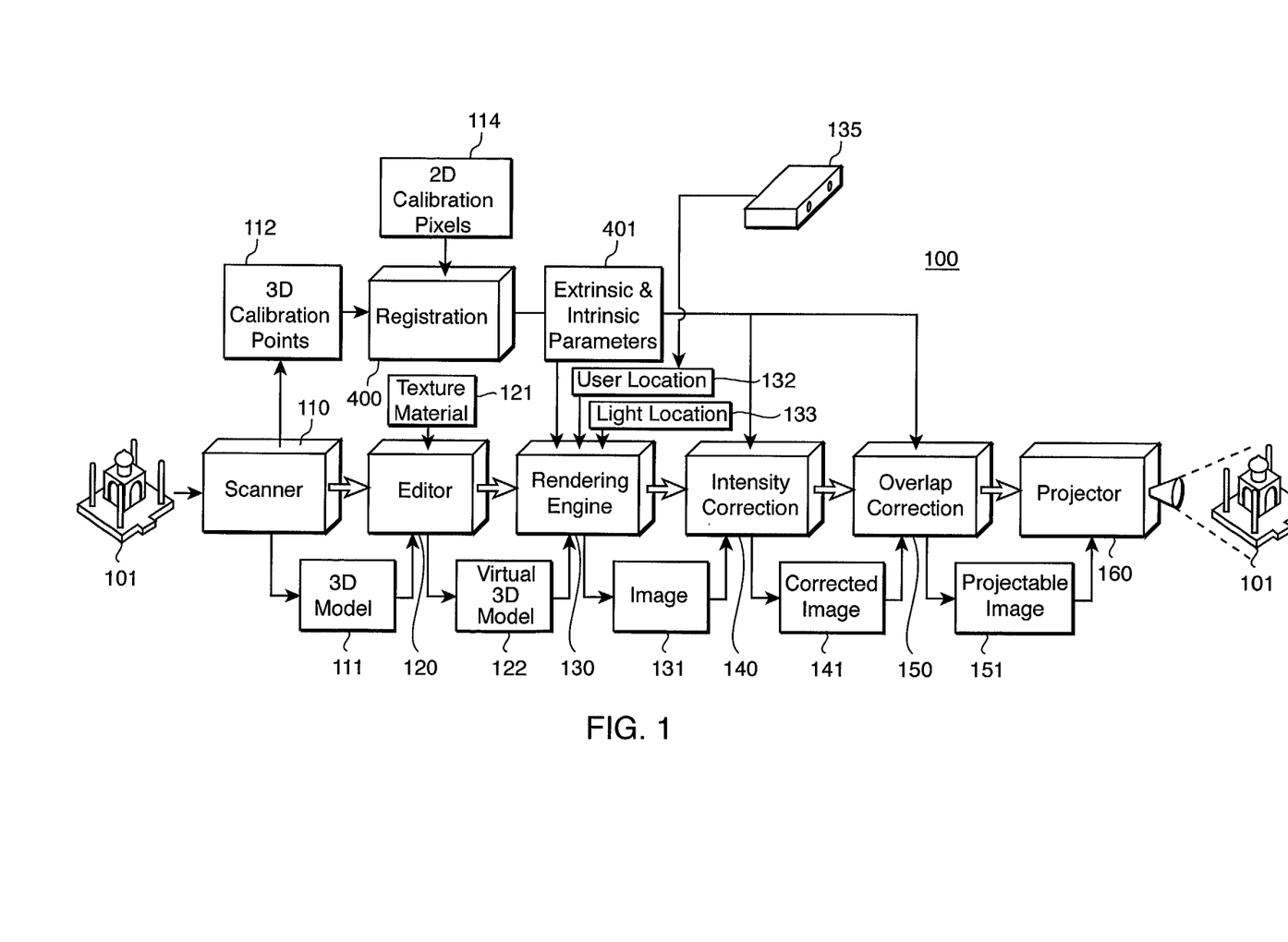
FIG. 1 is a flow diagram of a system and method according to the invention.

As shown in FIG. 1, a system 100 according to our invention begins by scanning a real world three-dimensional (3D) physical object or structure 101 in order to acquire a 3D graphics model 111 of the object. For example, the 3D physical object 101 is a scaled-down wooden reproduction of the Taj Mahal. The Taj Mahal miniature is spray-painted a neutral (white) color. Its dimensions are approximately 70 cm×70×35 cm.

The 3D physical object 101 can be scanned, for example, by a 3D touch probe sensor that gives readings with an accuracy of 0.5 mm. The scanner 110 can also user other technique, such as sonar or laser ranging, stereo vision, 3D imaging, and the like, to acquire the exact geometry of the 3D graphics model 111 representing the 3D physical object 101.

The graphics model can be stored in a computer memory as a triangle mesh, point cloud, or volumetric data. Other easy to render graphics data structures may also be used to represent the 3D physical object 101. In the preferred embodiment, the Taj Mahal model 111 is made up of 21,000 triangles. It should be noted that at this point the model 111 is view independent and "undecorated." That is, the model is entirely specified by connected vertices and their orientations (normals).

While the object is scanned, a set of 3D calibration points 112 are selected on the surface of the object, and the corresponding 3D model calibration points in the 3D graphics model are identified. The model calibration points are related to corresponding calibration pixels 114 in calibration images as described in greater detail below. For example, the calibration points 112 are easy to locate corners of the 3D physical object 101. The 3D calibration points and pixels are used by an optional automated registration step 400 described in greater detail below. This step "registers" a projector 160 with the object 101. The registration step 400 determines extrinsic and intrinsic parameters 401 to be used while rendering computer graphics images. The projection of a perspective illumination device has up to eleven degrees of freedom, six external and five internal. Therefore, a minimum of six fiducial points are required in order to resolve the extrinsic and intrinsic parameters that will allow us to exactly determine the necessary transform to align projected images of the model 111 with the 3D physical object 101. To increase the accuracy of the calibration 400, we use at least twenty points.

Model Editing

During step 120, the 3D model 110 is enhanced or "decorated" with view-independent texture and view-dependent material characteristics to reflect a desired appearance of the object. This step can use any number of available computer graphics authoring tools. Typically, texture is defined by colored patterns. We use fifteen texture maps. The material appearance characteristics determine how the object should appear when viewed from different angles. For example, a shiny or metallic object will appear differently than a dull object under different viewing and lighting arrangements.

Normally, in the physical world, the texture and lighting associated with the surface of a physical object are an integral part of the object. We express these object characteristics using modified bi-directional reflectance distribution functions (BRDF), described in greater detail below. A number of hardware and software solutions are available to generate a highly detailed, virtual 3D graphics model 122. In an alternative embodiment, the model is interactively edited by applying a hand-held virtual "paint brush" tool directly to the 3D physical object 101. The results of the user interaction can be stored in the computer memory for concurrent or later projection.

Rendering Step 130 renders an image 131 of the virtual 3D graphics model 122 using a rendering engine so that the appearance of the 3D physical object 101 can be modified in novel ways. In addition to the virtual 3D model 122, the rendering engine 130 also takes as input the extrinsic and extrinsic parameters 401 determined during registration 400 and a location 132 of a user viewing the 3D physical object 101, i.e., in classical terms, the "camera" location.

For the purpose of correctly computing specular highlight effect, we can use, e.g., an Origin Instruments DynaSight™ optical tracking system 135 to track the location 132 of a moving user. The system 135 includes a compact, self-contained stereo-sensor that measures the instantaneous three-dimensional position of a passive target. The sensor automatically acquires and tracks the user in an uncontrolled environment.

The input also includes a location 133 of a virtual light that is used to illuminate the model 111.

Although the rendering view defined by the pose (location and orientation) of the projector remains fixed, the shading view is specified dependent on the user's location. In a traditional renderer, it is assumed that the viewer is directly behind or in front of the projector. That is, the viewer is aligned with the system's optical axis. This is not necessarily the case with our system 100. Therefore, the view setup for the rendering engine 130 needs to be modified to take account for a moving viewer.

Figure 2:
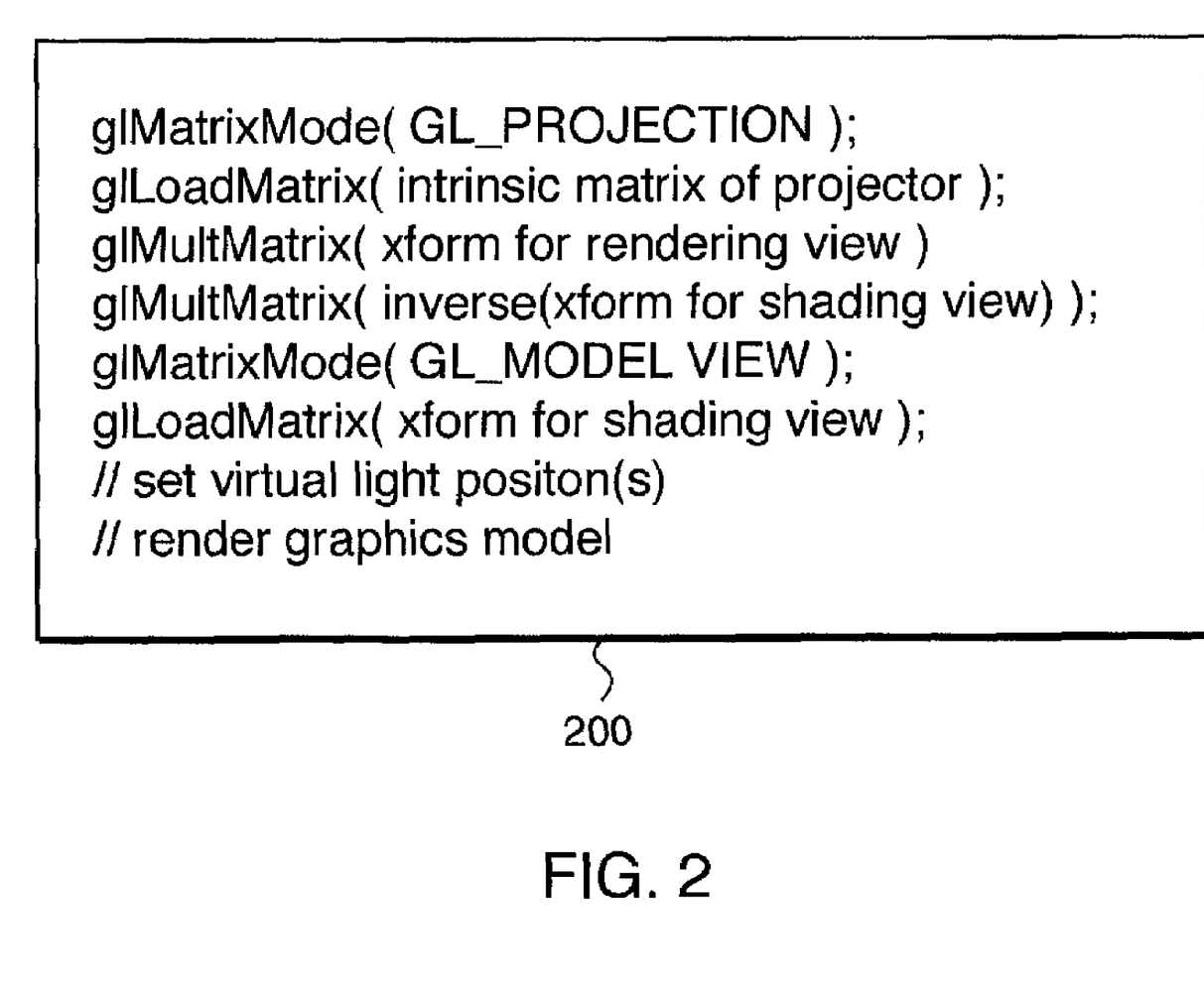
FIG. 2 is a block diagram of a procedure for resolving multiple coordinate systems while rendering graphics images.

FIG. 2 shows the steps of the procedure 200 that performs this setup. Essentially, the procedure 200 sets up separate transformation matrices for projector and shading parameters that are viewer dependent. The procedure is designed to operate with, for example, the OpenGL rendering programs.

When we simulate motion of static objects, we project images of moving objects on the static objects. For example for a rotationally symmetric vase, we project images generated from a rotating model of the vase to give the illusion of virtual motion of the static object. We take this concept further when illuminating a scene made of multiple objects. We project images corresponding to different but consistent motions on different parts of the scene. For example, to generate the effect of a car moving on a road, we project an image where the portion illuminating the wheels rotate about the axle of the wheels, while the road under the car or other portions of the back-drop move backwards. In addition, the motion of the wheels and the motion of the back-drop is consistent. As the wheels rotate faster, the backdrop translates at a higher rate giving the illusion that the static car is indeed moving faster.

Intensity Correction

Step 140 corrects the intensity of the rendered image 131 on a per pixel basis to take into account for the orientation of the neutral surface of the 3D physical object 101, and the radiance for the oriented surface. The image intensities can be corrected using alpha-blending available in the graphics hardware. The details of this step are further described below. Standard rendering usually assume that the image 131 is projected onto a single flat surface, e.g., a screen of a display device or a piece of paper, that is perpendicular to and centered on the optical axis. In our system 100, the image 131 can be projected onto a complex object or structure having any number of arbitrarily shaped surface oriented at various angles, including curved portions. This step produces a corrected image 141.

Cross-Fading

As stated above, our invention can illuminate an entire object 101 or structure so that the viewer can perform a walk-around or walk-through to get a view of the object from various angles. In this case, multiple images need to be projected. If multiple projectors 160 are used, then there are multiple instances of steps 400, 130, 140, 150. Because the projected images can overlap, an additional corrective step 150, described in greater detail below needs to be applied to obtain a final projectable image 151. This step 150 feathers or blends the images in regions of overlap. The feathered or blended images 151 are supplied to the projector(s) 160, as a last step, to illuminate the 3D physical object 101. In one embodiment, we use two digital projectors displaying pixels at a 1024×768 resolution.

At this point, it should be noted that the projected images can vary dynamically to take into consideration varying viewer locations, object orientations, and virtual lightings. Alternatively, the object can be rotated to enable the user to view the object at various angles from a single location, or the images can make a stationary object appear as if it is rotating. The illuminated environment can also be a large scale structure in which the user is virtually immersed. In this case, the illumination can be done with one or more steerable laser beams instead of a projector.

The entire method 100 can be summarized by the following pseudo code.

During Pre-Processing
  Acquiring a 3D graphics model of a 3D physical object
  Approximately positioning a projector
  Determining a pose of the projector with respect to the physical object
During Run-Time
  Defining a user location
  Editing the model to reflect a desired appearance of the object
  Modifying the edited model based on the user location
  Rendering the model as an image based on the pose and user location
  correcting image intensities for a surface orientation of the object
  Blending image intensities for overlap and occlusion
  Projecting the corrected and blended modified image on the object We will now describe the details of realistically treating the illuminating a physical object with virtual images, and the components and steps of the system according to the invention.

Illumination and Appearance

The appearance of a surface of an object or a structure is determined by the radiance at its surface. Hence, we generate any arbitrary appearance on a neutral surface by procedurally rearranging the incident radiance. In other words, the appearance on the neutral surface of the 3D physical object 101 is achieved by rendering an image for a given viewer location and warping the image during intensity corrections 140. In order to change the appearance of the physical object, we rearranging the terms in the relationship between illumination and reflectance to reproduce an equivalent radiance at any surface point of the 3D physical object 101.

Figure 3A:
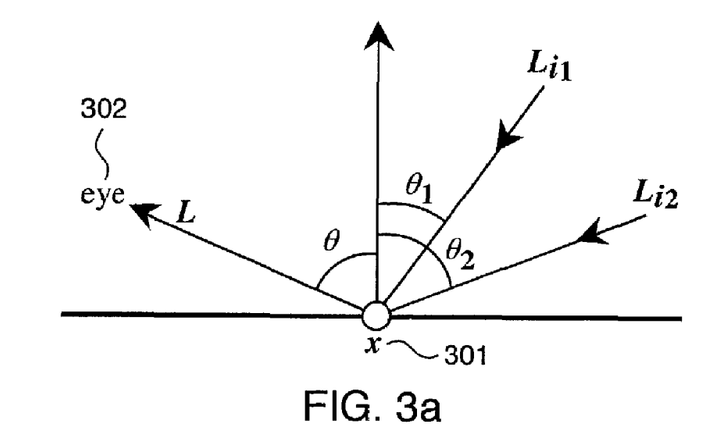
FIGS. 3a–b are graphs of radiance at a point in a given direction.
Figure 3B:
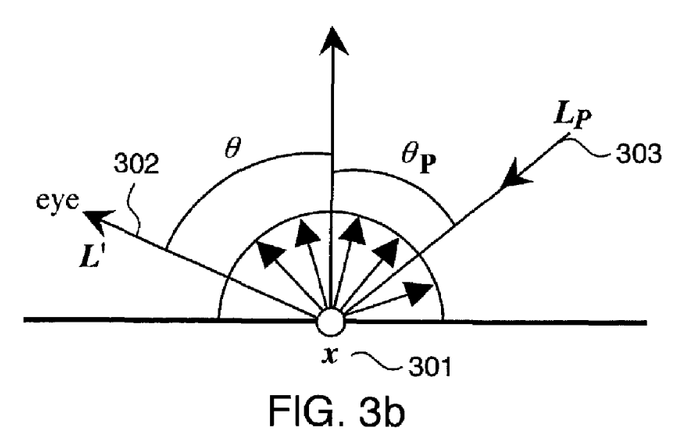

FIG. 3a shows the radiance in a certain direction at a point x 301, which has a given BRDF in the physical world, that can reach an observer 302. As shown in FIG. 3b, this radiance can be mimicked by changing the BRDF and illuminating the point 302 with a appropriately located light source, e.g., a projector pixel 303. Below, we describe a process for adjusting the radiance and for determining the necessary intensity of the projector pixels, given the position and orientation of the viewer and the virtual scene.

For a more systematic rendering, we introduce the notion of separating the rendering view (FIG. 3a), i.e., the traditional virtual camera view, from the shading view (FIG. 3b), i.e., the position of the viewer with respect to the 3D physical object 101 for lighting calculations.

We begin with a basic rendering equation that approximates the geometries of the various optical paths. Such an equation is described by Kajiya in "The Rendering Equation," Computer Graphics 20(4), pp. 143–151, 1986. The radiance at the visible surface point x 301 in the direction ($\theta$, $\phi$) that reaches the observer 302 of a physical realization of the scene is $$L(x,\theta,\phi)=g(x,\theta,\phi)(L_e(x,\theta,\phi)+h(x,\theta,\phi)), \quad (1)$$

where $$h(x,\theta,\phi)=\int F_r(x,\theta,\phi,\theta_i,\phi_i)L_i(x,\theta_i,\phi_i)\cos(\theta_i)d\omega_i, \quad (2)$$

and $g(x,\theta,\phi)$ is a geometry term, i.e., visibility and distance, $L_e(x,\theta,\phi)$ is the emitted radiance at the point, non-zero only for light sources, and $F_r(x,\theta,\phi,\theta_i,\phi_i)$ is the BRDF of the point. The integral in $h(x,\theta,\phi)$ accounts for all reflection of incident radiance $L_i(x,\theta_i,\phi_i)$ from solid angles $d\omega_i$. Radiance has dimensions of energy per unit time, area and solid angle.

Treating each of the projected pixels as a point emitter, the radiance due to direct projector illumination at the same surface point at distance $d(x)$, but with diffuse reflectance $k_u(x)$ is expressed by $$L'(x,\theta,\phi)=g(x,\theta,\phi)k_u(x)I_p(x,\theta_p,\phi_p)\cos(\theta_p)/d(x)^2, \quad (3)$$

where $I_p(x,\theta_p,\phi_p)$ is the radiant intensity of the projected pixel in the direction ($\theta_p,\phi_p$), and is related to a discretized pixel value via filtering and tone representation.

We can reproduce radiance $L'(x,\theta,\phi)$ equivalent to $L(x,\theta,\phi)$, for the given viewer location, by solving equation (3) for the radiance intensity $I_p$:

$$I_p(x,\theta_p,\phi_p) = \frac{L(x,\theta,\phi)d(x)^2}{k_u(x)\cos(\theta_p)} \text{ for } k_u(x) > 0. \quad (4)$$

Thus, as long as the diffuse reflectance $k_u(x)$ is non-zero for all of the wavelengths represented in $L(x,\theta,\phi)$, we can effectively represent the surface attributes with appropriate corrected pixel intensities. However, in practice, the range of values that can be displayed are limited by the brightness, dynamic range and pixel resolution of the projector. It should be noted that if the 3D physical object 101 is illuminated by a steerable laser beam, the intensity of the beam can be varied accordingly while it scans across the object.

The rendering 130 according to our invention involves two viewpoints: the user's viewpoint and the projector's viewpoint. A simple approach would first render the image as seen by the user, which is represented by $L(x,\theta,\phi)$ as shown in FIG. 3a, and then use traditional image-based rendering techniques to warp this image to generate the intensity corrected projected image, represented by $I_p(x,\theta_p,\phi_p)$, see Chen et al., "View Interpolation from Image Synthesis," SGGRAPH '93, pp. 279–288, 1993, and McMillan et al. "Plenoptic Modeling," SIGGRAPH '95, pp. 39–46, 1995.

For a viewer location that is changing, view-dependent shading under static lighting conditions could also be implemented, see Levoy et al. "Light Field Rendering," SIGGRAPH '96, pp. 31–42, 1996.

However, we can avoid the warp because the display medium, i.e., the 3D physical object 101 is geometrically identical as the virtual 3D model 122.

For a single-pass rendering, we treat the location 133 of the user as the shading view. Then, the image rendering process involves rendering the scene from the projector's view, by using a perspective projection matrix that matches the projector's intrinsic and extrinsic parameters 401, followed by radiance adjustment as described above.

The separation of these two views has some interesting side effects. For a static projector, the visibility and view-independent shading determinations need to be performed only once, even when the location of the user is changing. To realize a real-time interactive implementation, we use the 3D rendering engine 130 which approximates the general rendering equation (1).

The BRDF process is divided into view-dependent specular, and view-independent diffuse and ambient components. View-independent shading determinations can be performed by assuming that the rendering and shading view are the same. We determine virtual shadows, also view-independent, by using a two-pass shadow-buffer technique.

However, traditional rendering engines do not support specular highlights for view-dependent shading for two separate views. Therefore, we perform the steps of the procedure 200 as shown in FIG. 2.

Secondary Scattering

Because the 3D physical object 101 has a neutral surface with diffuse characteristics, secondary scattering is unavoidable. This can potentially affect the quality of the appearance of the illuminated object 101. When the virtual 3D model 122 is purely diffuse, the secondary scattering can be used to our advantage.

The geometric relationships, also known as form factors, among parts of the physical object 101 are naturally identical to same parts of the virtual 3D model 122. Consider the radiosity solution for a patch i in a virtual scene with m light sources and n patches:

$$B_{i-intended} = k_{d_i} \sum_j B_j F_{i,j} = k_d \left( \sum_m B_m F_{i,m} + \sum_n B_n F_{i,n} \right). \quad (5)$$

Here, the value $k_d$ is the diffuse reflectance, $B_j$ is the radiance of patch j, and $F_{i,j}$ is the form factor between patches. Using the system 100 to reproduce the effect of direct illumination, after radiance adjustment, we are able to generate the effect of m light sources:

$$B_{i-direct} k_{d_i} \sum_m B_m F_{i,m}. \quad (6)$$

However, due to secondary scattering, if the neutral surface have diffuse reflectance $k_u$, then the perceived radiance also includes the secondary scattering due to the n patches, and that gives us $$B_{i-actual} = B_{i-direct} + B_{i-secondary} = k_{d_i} \sum_m B_m F_{i,m} + k_u \sum_n B_n F_{i,n}. \quad (7)$$

The difference between the desired and perceived radiance is $$\left| (k_{d_i} - k_u) \sum_n B_n F_{i,n} \right|. \quad (8)$$

Thus, in cases where $k_d$ and $k_u$ are similar, we get approximate radiosity for "free." The projection of even a simple direct illumination rendering produces believable "spilling" of colors on neighboring parts of the physical objects. From the equation above, the secondary contribution from the neutral surface is certainly not accurate, even when we reproduce the first bounce exactly. The difference is even larger when the virtual object has non-Lambertian reflectance properties.

Illumination of All Visible Parts of the Surface of the Object

For a complex physical object such as the Taj Mahal miniature 101, it is a problem to determine a good set of poses (location and orientation) for the projectors so that every visible surface is illuminated by at least one projector. This problem was partially addressed by Stuerzlinger "Imaging all Visible Surfaces," Graphics Interface '99, pp. 115–122, 1999. Using a hierarchical visibility algorithm, he determined a set of camera viewpoints such that every visible part of every surface is illuminated by at least one projector. The problem of determining an optimal set of poses is NP-hard and is related to the art gallery problem described by O'Rourke "Art Gallery Theorems and Algorithms," Oxford University Press, New York, 1987, known in the field of computational geometry.

Detailed System Components and Method Steps

Image-based illumination of physical objects, in addition to the illumination problem described above, is still faced with several other problems. First is the geometric registration problem. There is a need to match the projection of each 2D image 151 with the physical 3D object 101. This could be done manually. However, the projection of a perspective device has up to eleven degrees of freedom. Therefore, any effort to manually achieve the registration is likely to be extremely tedious and error prone. Below, we describe an automated technique for performing this registration. The second problem, for which there is no know solution, is the complete illumination of non-trivial physical objects in presence of overlap, shadows and self occlusion.

Using digital projectors or steerable lasers, and real-time 3D graphics rendering, we enable new approaches for image-based illumination. First, we determine a 3D geometric understanding of the geometry of the object 101, the projector(s) 160, the viewer 132, and the desired virtual lighting 133. We also provide a procedure that performs an important intensity correction step 140, and deal with occlusion, shadows and overlapping images in steps 150.

Registration

One of the important tasks in achieving a compelling visualization is to associate the graphical primitives of the virtual 3D model 122 with the physical object 101 so that the appearance of the neutral object is enhanced. For example, we can specify any texture image that is to be displayed on the surface of the object with the authoring tools 120. We can also alter the color distribution that improves the appearance of the object. We would also like to view the object under various lighting conditions, real or imagined.

Figure 4:
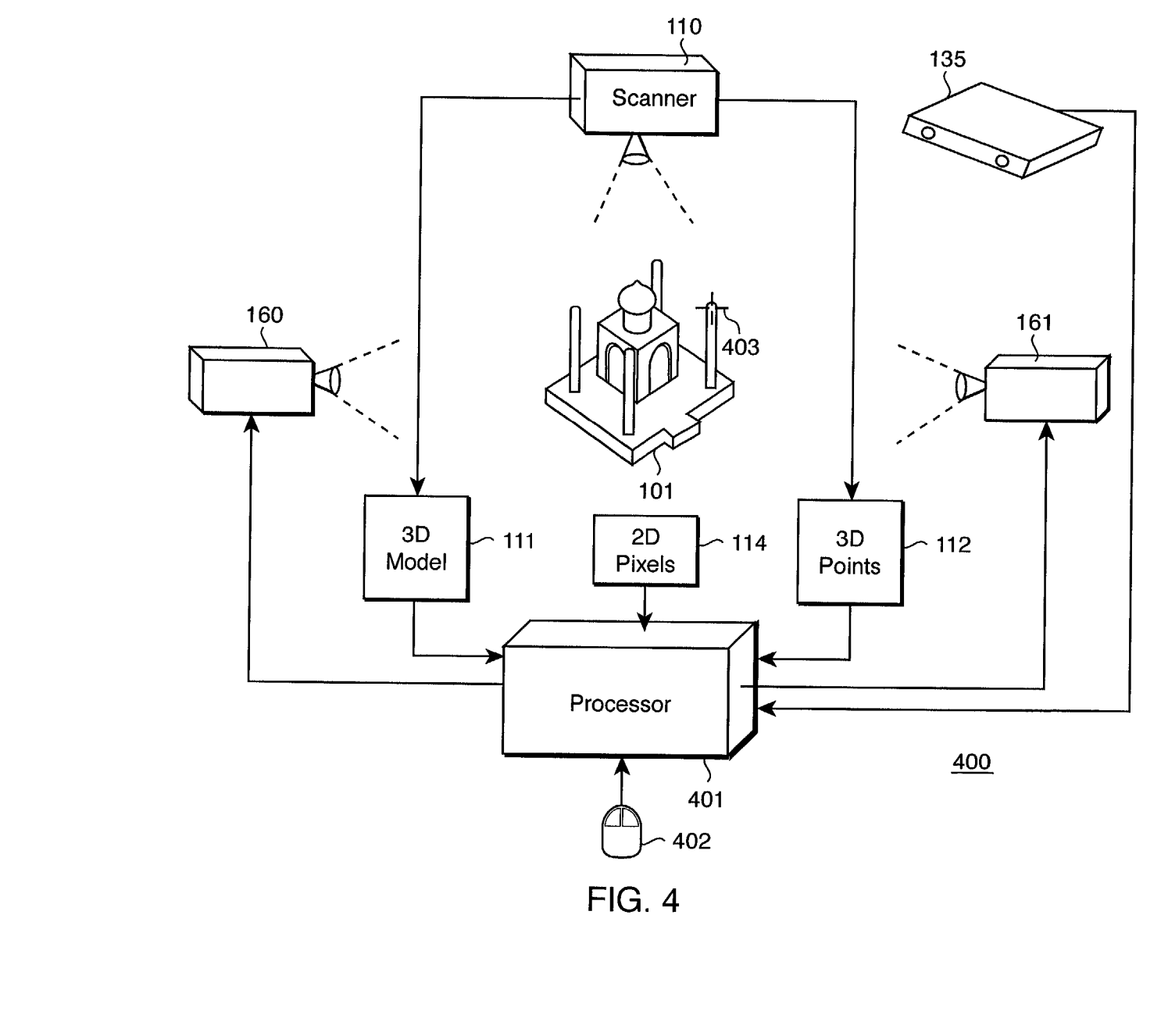
FIG. 4 is a flow diagram of a registration method used by the invention.

As shown in FIG. 4, we use a processor 401 to register 400 the 3D physical object 101 with the model 111 obtained by the scanner 110 as follows. The processor 401 is coupled to all of the hardware components that comprise the system 100 of FIG. 1. This processor can also include memory, and software and hardware of the editor and rendering engine.

First, we approximately position each of the projectors 160–161, generally, illuminating device, so that projected images would substantially illuminate the physical object 101. Next, for each projector, we illuminate the 3D physical object 101 with a calibration cross-hair 403. An input device 402 is used to align the projected cross-hair 403 with each of the selected 3D calibration points 112 of the physical object 101 in turn. This determines the coordinates of the corresponding 2D calibration pixels 114, i.e., the pixel at the exact center of the cross-hair 402. We then adapt the geometric relationship between the 3D and 2D points to determine the projector's intrinsic and extrinsic parameters 401 from the rigid transformation between the coordinate systems of the object and the projectors. The transform is in the form a 3×4 perspective projection matrix up to scale, which is decomposed to find the intrinsic and the extrinsic parameters 401 of the projectors, see Faugeras "ThreeDimensional Computer Vision: A Geometric Viewpoint," MIT Press, Cambridge, Mass., 1993. The rendering step 130 uses the same internal and external parameters 401, so that the projected images 151 are exactly registered with the physical object 101, even if the projectors are approximately positions with respect to the 3D physical object 101.

Intensity Correction

The intensity of each rendered image 131 is corrected 140 on a per pixel basis, for each projector, to take into account the reflectance of the neutral surface of the 3D physical object 101, the local orientation and distance with respect to the projector using equation (4). Because the surface normals used to determine the $1/\cos(\theta_p)$ correction are available only at the vertices in a polygonal graphics model, we exploit the rendering engine 130 for approximate interpolation. We illuminate a white diffuse version of the 3D model 111, or a model matching appropriate non-zero diffuse reflectance $k_u(x)$ of the physical model 101, with a virtual white light placed at the location of the projector, and correct the intensity for inverse squared distance attenuation.

The resultant intensities of the pixels vary smoothly across curved surface due to shading interpolation and inversely proportional to a factor.

$$\frac{d(x)^2}{k_u(x)\cos(\theta_p)}.$$

If the illumination device 160 has a limited dynamic range, we only illuminate portions of the surface with and angle $\theta_p < 60$ because at greater angles $1/\cos(\theta)$ ranges from two to infinity. This avoids a low sampling rate of the projected pixels on severely oblique portion of the surface. This also minimizes mis-registration artifacts due to any errors in the geometric registration 400. During the calculations to locate overlap regions, described below, severely oblique portions of the surface are considered not to be illuminated by any projector, i.e., these are in the "shadow."

Correcting Occlusions and Overlaps by Cross-Fading

For a complete illumination of the 3D physical object 101, we use more than one projector. This leads to the difficult problem of seamlessly merging images from multiple projectors. A naive solution would simply illuminate any given surface patch by only one given projector. However, there are two main problems when dealing with overlapping projectors. The first problem is the lack of color equivalence between neighboring projectors due to manufacturing process and temperature color drift during their use, see Majumder et al. "*Color Calibration of Projectors for Large Tiled Displays*," Proceedings of IEEE Visualization 2000, IEEE Science Press, 2000.

The second problem is our desire to minimize the sensitivity to small errors in the estimated geometric calibration parameters, or mechanical variations. Therefore, we use feathering or cross-fading, also known as blending, to adjust the intensities of pixels in regions where images overlap.

Cross-fading has been used in the past to generate seamless panoramic photo-mosaics by combining several views from a single location, Szeliski et al., "*Creating Full View Panoramic Mosaics and Environment Maps*," SIGGRAPH 97 Conference Proceedings, pp. 251–258, 1997. Similar techniques are known in multi-projector wide-field-of-view displays, see Raskar et al. "*Multi-Projector Displays Using Camera-Based Registration*," Proceedings of IEEE Visualization '99, 1999, and two-dimensional arrays of flat projections. In the prior art systems, the overlap region is typically a well-defined contiguous region on a planar display surface, as well as in each projector's frame buffer.

Figure 5:
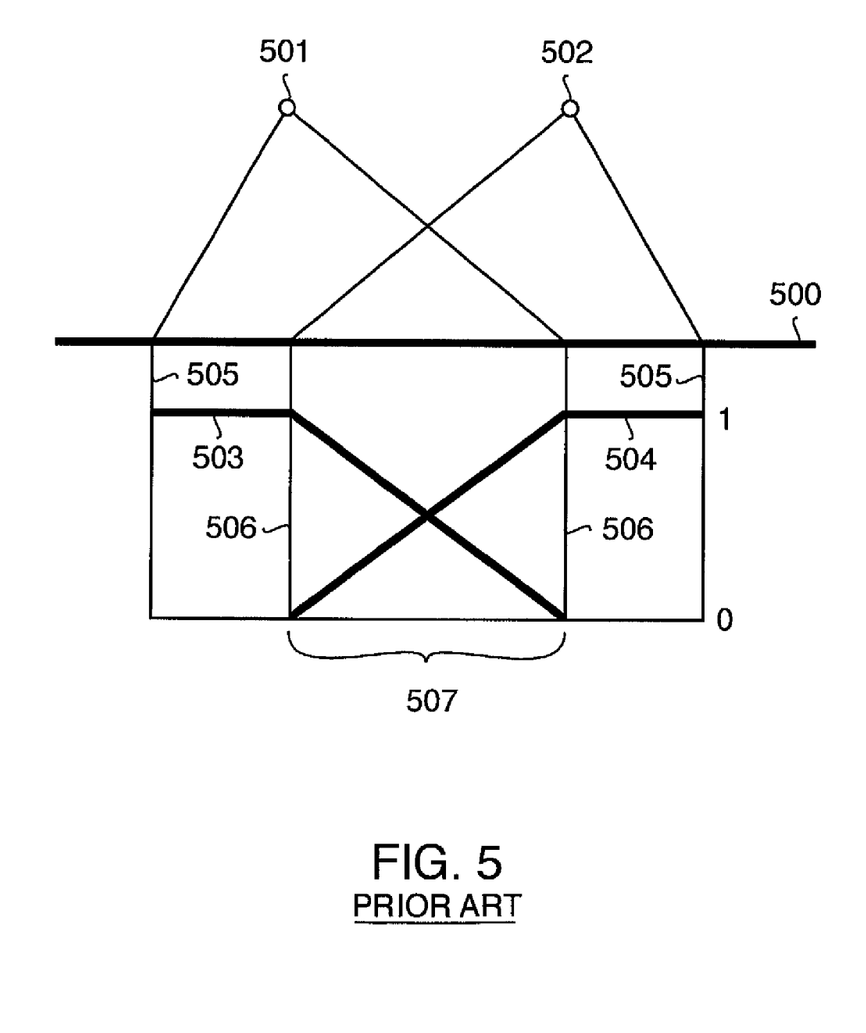
FIG. 5 is a graph of prior art intensity correction.

FIG. 5 shows a profile of prior art cross-fading. In this case, projectors 501–502 illuminate a single continuous flat surface 500 with overlapping source images to generate a single target image. Known correction methods typically simply weight the intensities 503–504 of the corresponding pixels proportional to their Euclidean distance to a nearest boundary 505, or non-contribution pixel 506 of an adjacent image. The weights, in the range [0, 1], are multiplied by the pixel intensities to determine the final target image.

The pixels weights near the boundary of a source image are near zero so that these pixels contribute very little to the target image, and there is a smooth transition to the adjacent image. Under ideal conditions, and assuming color equivalence, the weight contribution of all pixels of all images in the target image adds up to one. Even when the color response of one projector is different than any of the other projectors, the target image usually transitions smoothly in the region of overlap 507. This weight assignment strategy works well only when the source images illuminate a continuous planar surface at and around the region of overlap 507.

Figure 6:
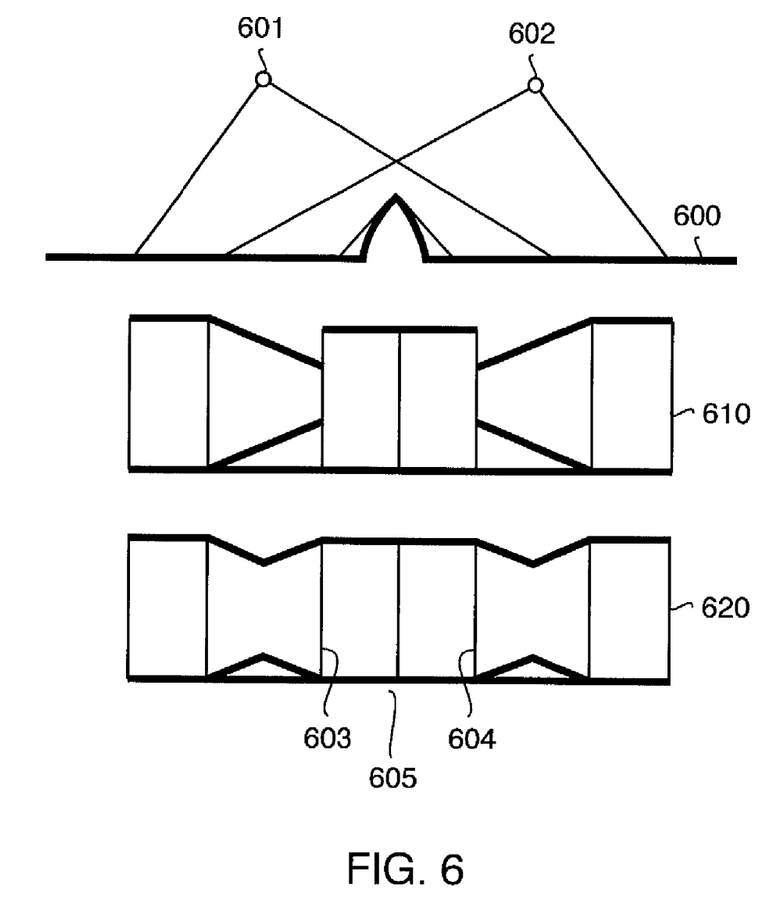
FIG. 6 is a graph of cross-fading according to the invention.

In our case, as shown in FIG. 6, the surface 600 of the physical object 101 illuminated by the projectors 601–602 can be constructed of variously shaped parts, or the scene can include multiple different objects, a collection of disjoint objects resulting in shadows and fragmented overlap regions. More important for complex objects, overlap regions can containing surfaces with depth discontinuities resulting in occlusions. Now, with unequal color response, the resultant intensity distribution has offending sharp changes, e.g., at points 603–604.

This problem is similar to the problems faced in image-based rendering (IBR), where warped, depth-enhanced images generate dis-occlusion artifacts. When multiple source images are warped to the target image, the color assigned to a particular pixel needs to be derived, either from a single target image where the pixel values overwrite each other, or as a weighted combination of corresponding pixels from source images.

Feathering, which actually blurs the result, is usually necessary to overcome minor color difference in corresponding pixels in source images, and to hide ghosting effects due to small mis-registration errors.

One of the few solutions to this problem is described by Debevec et al. "*Efficient View-Dependent Image-Based Rendering with Projective Texture-Mapping*," Proc. of 9th Eurographics Workshop on Rendering, 1998. They scale the intensities by weights proportional to the angles between the source images and the target image. However, this does not guarantee that the weights will transition smoothly across the surface of the scene. As a result, seams can appear in the target image where neighboring polygons are rendered with very different combinations of images. The plots 610 show the sample weighting scheme based on their solution and the corresponding problems.

Our method relies on the following three constraints. First, the sum of the intensity weights of all of the corresponding source pixels should be one in the target image so that the intensities are normalized. Second, the weights of source pixels of a particular projector along a physical surface change smoothly in and near regions of overlap so that the inter-projector color differences do not have visible discontinuity in the target image. Third, the distribution of intensity weights of the pixels of a particular projector within its frame-buffer is smooth so that small errors in calibration, or mechanical variations do not result in sharp edges.

In practice, it is easier to achieve and maintain precise geometric calibration than to ensure color equality among a set of projectors over a period of time. This makes the second constraint condition more important than the third. However, it is not always possible to satisfy the second and third constraints, e.g., when an occluded part moves closer to the display surface at 605. Hence, these constraints suggest solving the feathering problem, without violating the weight constraints at depth discontinuities and shadow boundaries.

Figure 7:
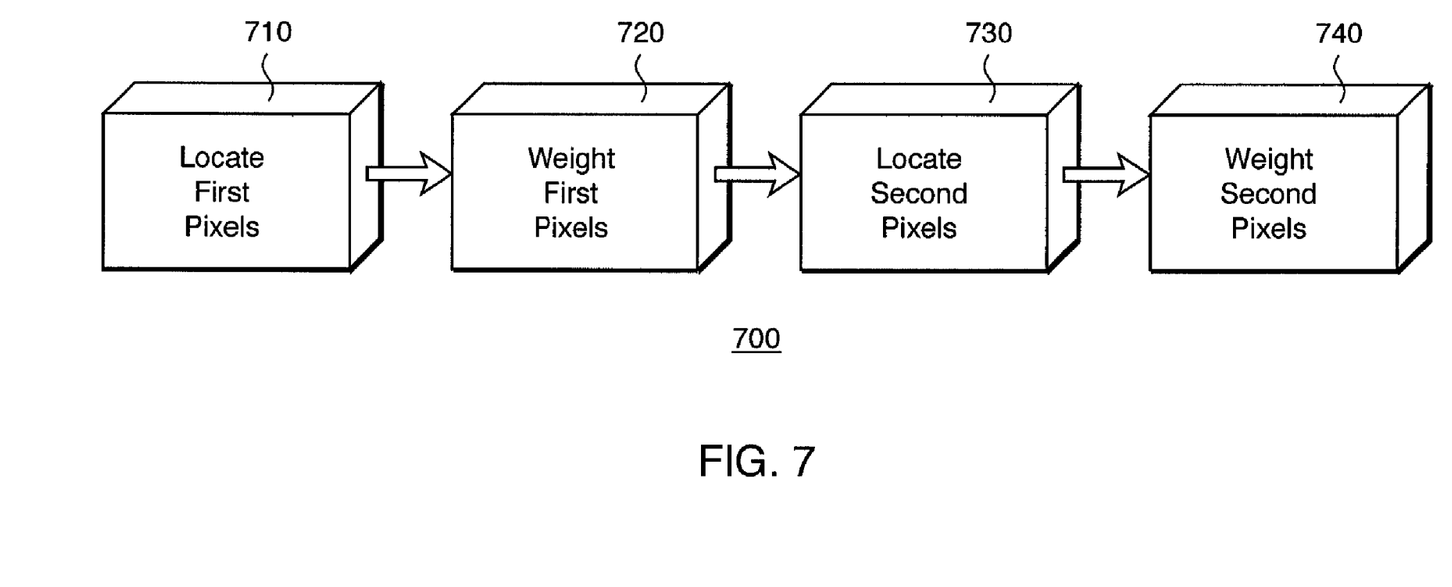
FIG. 7 is a flow diagram of a method for correcting image intensities.

Instead of using the distance to the nearest boundary pixel to find the pixel weights, as in the prior art, our method 700, as shown in FIG. 7 proceeds as follows. First, we locate 710 a first set of pixels corresponding to regions illuminated by a single projector. We assign 720 each of these first pixels an intensity weight of one. Then, for each remaining pixel (in a second set), we next locate 730 a nearest pixel having a weight of one. To measure distances, we compute Euclidean (straight-line) distances. In step 730, we ignore paths that cross depth discontinuities. In step 740, we assign a weight to each second pixel that is inversely proportional to the distance to the nearest eligible pixel with a weight of one.

Even under different color response, our method generates smooth transitions on planar surface in the presence of shadows and fragmented overlaps as shown by plot 620 of FIG. 6. Our method can also be used for more than two projectors, and for blending pixels in regions of overlap and occlusion resulting from image-based rendering systems.

Figure 8:
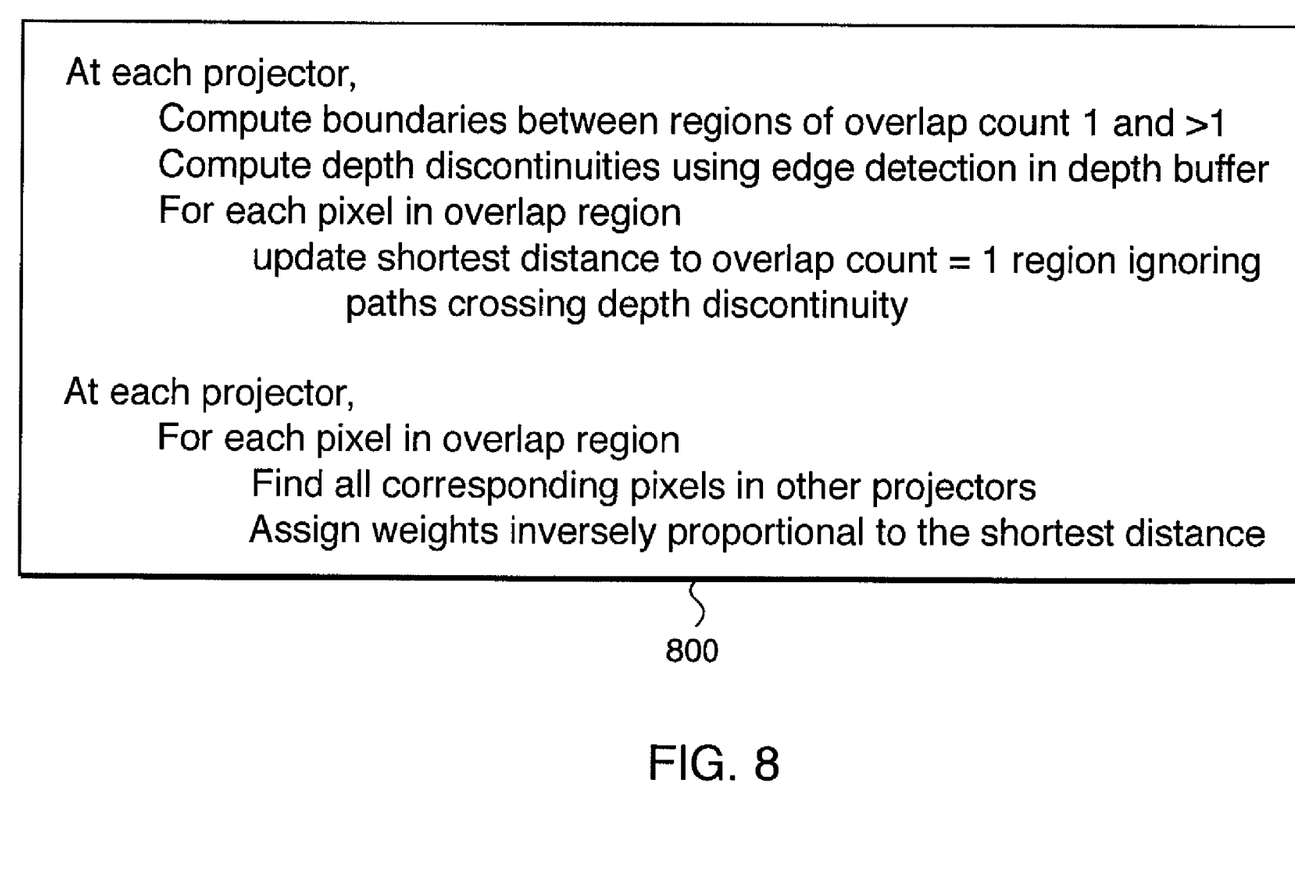
FIG. 8 is a block diagram of a procedure for correcting image intensities.

In a practical implementation, we use two buffers, a depth buffer and an overlap buffer. The depth buffer is updated with weighted pixel intensities while rendering 130 the virtual 3D model 122. The overlap buffer contains an integer value for each pixel in the target image. The integer value indicates the number projectors that contribute source pixels that that target pixel. Weights for pixels in regions of overlap, i.e., pixels having corresponding integer values greater than one in the overlap buffer, use traditional shadow-buffer techniques. The pseudo code 800 for the method 700 is shown in FIG. 8.

For some pixels in the overlap region, it may not be possible to locate a nearest pixel for which an overlap count of one can be found. In this case, the shortest distance is assumed to be a large value. This substantially reduces the weight in isolated regions and also cuts down unnecessary transition zones.

Simulating Motion of a Static object in a Scene

Figure 9:
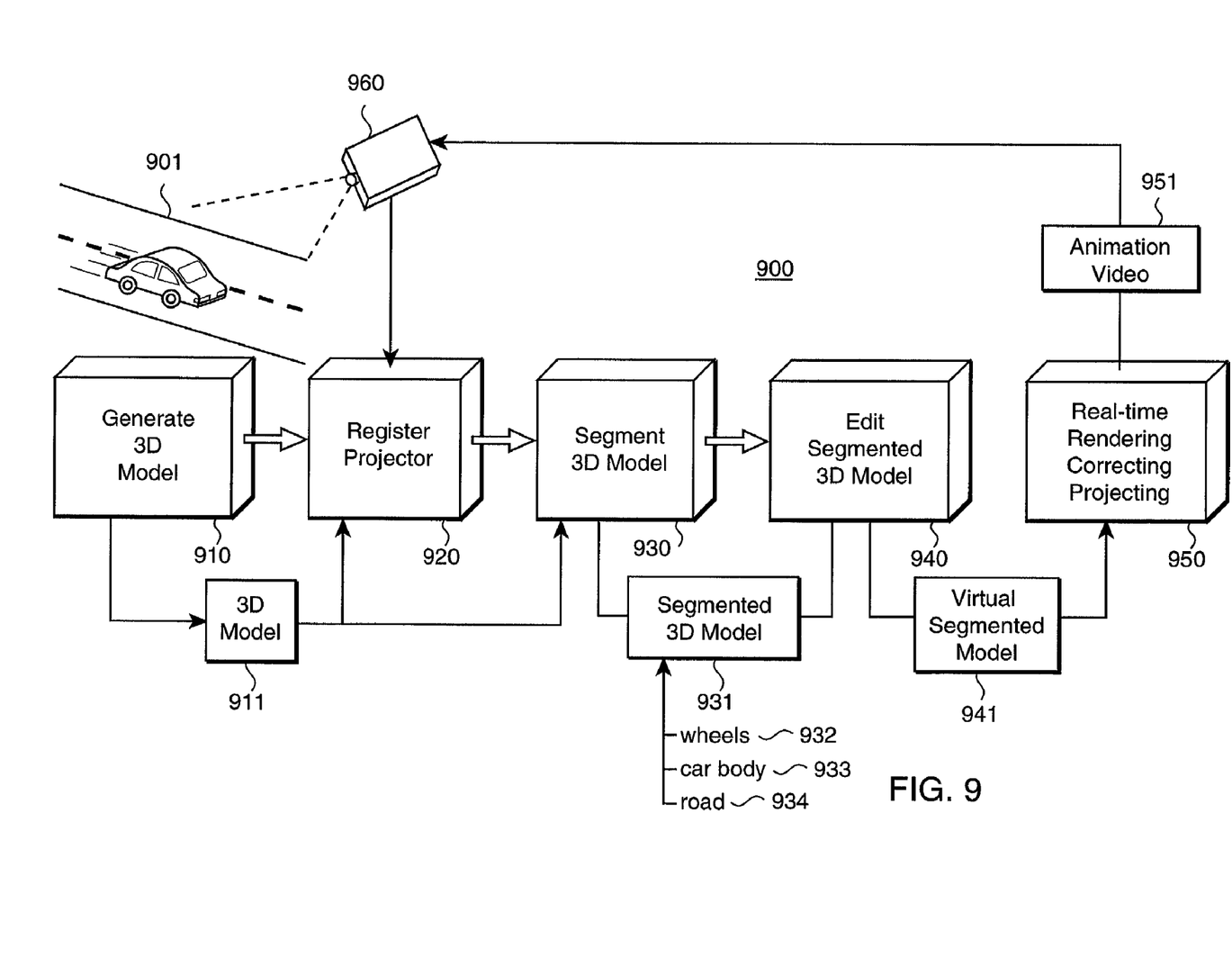
FIG. 9 is a flow diagram of a method for simulating motion of a static object in a scene.

FIG. 9 shows the steps of a method 900 for simulating motion of a static object in a static scene. First we generate a 3D model 911 of the object and the scene 901, for example a neutral toy car statically positioned on a white back-drop. Then, we register 920 the projector 960 with the object and the model as described above. User and lighting locations can also be provided.

Next, the 3D model 911 is segmented 930 to indicate the different parts that move and animate separately with different degrees of freedom. For example, in the segmented 3D model 931, the wheels, are segmented from the car body, and the entire car is segmented leaving a back-drop portion as a separate portion. It should be understood that the number of segments is entirely dependent on a particular application.

The segmented 3D model 931 is edited 940 to create a virtual segmented model 941. The motion of the various segment can independently consider rotation, translation, and other effects to provide the appropriate illusionary movement. For example, motion blur and moving shadows can be added, reflections and other global visual effects can be added as necessary If required, a consistent relationship can be enforced between the motion of different parts. For example, the clock-wise rotation of the wheels is consistent with the backward motion of the road-surface on the back-drop to give the impression that the car is speeding forwards. The virtual 3D model is then rendered corrected, and projected in real-time onto the object and scene 901.

Applications

In a simplest form, the system 100 can be used to dynamically change the appearance of day-to-day objects and structures, or to add temporary markings on them. For example, engineers can mark areas of interest, such as drilling locations, without affecting the physical surface. Urban planners can visualize city models under various lighting condition. For stage and outdoor shows, the system can change backdrops as well as objects and props in scenes. Sculptors can illuminate clay models to simulate various textures and finishing materials before the design is finalized. Image-based illumination can also be used in the movie industry to enhance details on miniature sets. The system can also be used with interior and exterior architectural models. Instead of building exact detailed physical replicas, the designer can use simple Styrofoam components, such as boxes, spheres and cylinders, that are virtually decorated.

We have described a new mode for the visualization of 3D computer graphics, which involves light projectors and physical objects to generate rich detailed images directly in the user's world to enable new ways of interacting with synthetic imagery. We have presented techniques that make image-based illumination of non-trivial objects practical. Our invented visualization system method is compelling for a variety of applications including training, architectural design, art and entertainment.

We claim:

1. A method for animating a 3D physical object, comprising:
    acquiring a 3D graphics model of the 3D physical object:
    editing the 3D graphics model with graphics authoring tools to reflect a desired appearance of the 3D physical object;
    rendering the virtual 3D graphics model as an image considering a user location with respect to the 3D physical object and a location of a virtual light;
    correcting intensity values of the image according to an orientation of a surface of the object and a radiance at the surface to generate a corrected image; and
    illuminating the 3D physical object with the corrected image to give the 3D physical object the desired appearance under the virtual light when viewed from the user location, wherein the illuminating further comprises:
        rendering the virtual 3D graphics model as plurality of images parallel considering the user location and the location of the virtual light;
        correcting intensity values of each of the plurality of the plurality of images according to the orientation of the surface of the object and the radiance at the surface to generate a corresponding corrected image for each image of the plurality of images; and
        illuminating the 3D physical object with the corrected plurality of images in parallel to give the 3D physical object the desired appearance under the virtual light when viewed from multiple user locations.

2. The method of claim 1 further comprising:
    scanning the 3D physical object with a 3D touch probe sensor to acquire the 3D graphics model.

3. The method of claim 1 further comprising:
    storing the 3D graphics model in a computer memory as a triangle mesh model entirely specified by connected vertices and orientations of the vertices.

4. The method of claim 1 further comprising:
    registering a projector with the 3D physical object, the projector configured to illuminate the 3D physical object with the corrected image.

5. The method of claim 4 further comprising:
    specifying separate transformation matrices for the projector and shading parameters that are dependent on the user location.

6. The method of claim 4 wherein the projector is a steerable laser.

7. The method of claim 1 further comprising:
editing view-independent texture and view-dependent material characteristics of the 3D graphics model to reflect the desired appearance.

8. The method of claim 1 wherein the editing is interactive by applying a hand-held virtual paint brush tool directly to the 3D physical object.

9. The method of claim 1 further comprising:
tracking locations of a moving user.

10. The method of claim 1 wherein the moving user is tracked with a stereo-sensor.

11. The method of claim 1 wherein the intensities are corrected using alpha-blending of a rendering engine.

12. The method of claim 1 wherein the 3D physical object includes an arbitrarily shaped surface oriented at various angles.

13. The method of claim 1 further comprising:
blending intensity values in the corrected plurality of images in regions of overlap.

14. The method of claim 1 wherein the desired appearance simulates a rotation of the 3D physical object.

15. The method of claim 1 wherein the 3D physical object is illuminated with a digital projector.

16. A method for animating a 3D physical object, comprising:
acquiring a 3D graphics model of the 3D physical object:
editing the 3D graphics model with graphics authoring tools to reflect a desired appearance of the 3D physical object;
rendering the virtual 3D graphics model as an image considering a user location with respect to the 3D physical object and a location of a virtual light;
correcting intensity values of the image according to an orientation of a surface of the object and a radiance at the surface to generate a corrected image; and
illuminating the 3D physical object with the corrected image to give the 3D physical object the desired appearance under the virtual light when viewed from the user location, wherein the illuminating further comprises;
rendering the virtual 3D graphics model as a plurality of serial images considering a plurality of user location and a plurality of locations of the virtual light;
correcting intensity values of each image according to the orientation of the surface of the object and the radiance at the surface to generate a plurality of corrected images; and
illuminating the 3D physical object serially with the corrected plurality of images give the 3D physical object the desired appearance under the virtual light when viewed from the plurality of user locations.

* * * * *